United States Patent
Tenny

(10) Patent No.: US 9,215,626 B2
(45) Date of Patent: Dec. 15, 2015

(54) SYSTEM, APPARATUS, AND METHOD FOR UTILIZING NETWORK ACCESS PARAMETERS IN WIRELESS COMMUNICATION SYSTEMS

(75) Inventor: Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 13/167,582

(22) Filed: Jun. 23, 2011

(65) Prior Publication Data

US 2011/0317661 A1 Dec. 29, 2011

Related U.S. Application Data

(60) Provisional application No. 61/358,817, filed on Jun. 25, 2010.

(51) Int. Cl.
*H04W 4/00* (2009.01)
*H04W 36/00* (2009.01)

(52) U.S. Cl.
CPC ...... *H04W 36/0022* (2013.01); *H04W 36/0077* (2013.01)

(58) Field of Classification Search
None
See application file for complete search history.

(56) References Cited

U.S. PATENT DOCUMENTS

| | | | |
|---|---|---|---|
| 8,229,439 B2 | 7/2012 | Du | |
| 8,290,486 B2 * | 10/2012 | Hou et al. | 455/432.3 |
| 8,311,536 B1 * | 11/2012 | Pulugurta | 455/433 |
| 8,391,859 B1 * | 3/2013 | Pulugurta | 455/433 |
| 2008/0268849 A1 | 10/2008 | Narasimha et al. | |
| 2009/0129291 A1 * | 5/2009 | Gupta et al. | 370/254 |
| 2010/0009684 A1 * | 1/2010 | Du | 455/438 |
| 2010/0040022 A1 | 2/2010 | Lindstrom et al. | |
| 2010/0091653 A1 * | 4/2010 | Koodli et al. | 370/235 |
| 2011/0125881 A1 * | 5/2011 | Boldyrev et al. | 709/221 |

(Continued)

FOREIGN PATENT DOCUMENTS

| | | |
|---|---|---|
| CN | 101155416 A | 4/2008 |
| EP | 2068581 A1 | 6/2009 |
| EP | 2131538 A2 | 12/2009 |

(Continued)

OTHER PUBLICATIONS

International Search Report and Written Opinion—PCT/US2011/041836—ISA/EPO—Mar. 7, 2012.

(Continued)

*Primary Examiner* — Chi H Pham
*Assistant Examiner* — Soon-Dong D Hyun
(74) *Attorney, Agent, or Firm* — Arent Fox LLP

(57) ABSTRACT

In accordance with aspects of the disclosure, a method, apparatus, and computer program product are provided for wireless communication. The method, apparatus, and computer program product may be configured to provide a message from a first network to a device, wherein the message comprises one or more parameters for access to a second network, direct the device to switch from the first network to the second network based on the one or more parameters provided by the first network, and direct the device to perform random access on the second network based at least in part on the one or more parameters provided by the first network. The one or more parameters may comprise a priority parameter for performing random access on the second network.

48 Claims, 14 Drawing Sheets

(56) References Cited

U.S. PATENT DOCUMENTS

2012/0072979 A1\* 3/2012 Cha et al. .......................... 726/7
2013/0023266 A1\* 1/2013 Ma .............................. 455/426.1

FOREIGN PATENT DOCUMENTS

| JP | 2009535968 A | 10/2009 |
| JP | 2009273160 A | 11/2009 |
| JP | 2010505301 A | 2/2010 |
| JP | 2010505302 A | 2/2010 |
| JP | 2011520312 A | 7/2011 |
| WO | 2007126352 A1 | 11/2007 |
| WO | 2009117588 A1 | 9/2009 |

OTHER PUBLICATIONS

Translation of Korean Office Action for Korean Application No. 10-2013-7002104 dated May 29, 2014, 4 pages.
"Translation of First office action for Japanese Application No. 2013-516805 dated Jan. 21, 2014, pp. 1-3."
Notification of the First Office Action for Chinese patent application No. 201180040731.3 dated Dec. 26, 2014, pp. 1-16.
Chinese Office Action for Application No. CN201180040731.3 dated Jun. 25, 2015, 3 pages.

\* cited by examiner

SYSTEM, APPARATUS, AND METHOD FOR UTILIZING NETWORK ACCESS PARAMETERS IN WIRELESS COMMUNICATION SYSTEMS

CROSS-REFERENCE TO RELATED APPLICATION(S)

This application claims priority to and the benefit of U.S. Provisional Application Ser. No. 61/358,817, entitled "Network Access Parameters," filed on Jun. 25, 2010, which is expressly incorporated herein by reference in its entirety.

BACKGROUND

1. Field

The present disclosure relates generally to communication and, in particular, to utilizing network access parameters in wireless communication systems.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and worldwide interoperability for microwave access (WiMAX).

For wireless communication systems, these multiple-access technologies have been adopted in various telecommunication standards to provide a common protocol that enables different wireless devices to communicate on a municipal, national, regional, and even global level. An example of an emerging telecommunication standard is Long Term Evolution (LTE). LTE provides a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards utilizing OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Moreover, a wireless communication network may be deployed over a defined geographical area to provide various types of services to users within that geographical area. Access points (e.g., corresponding to different cells) are distributed throughout a network to provide wireless connectivity for access terminals (e.g., cell phones) that are operating within the geographical area served by the network.

At any point in time, the access terminal may be served by a given one of these access points. As the access terminal roams throughout this geographical area, the access terminal may move away from its serving access point and move closer to another access point. In addition, signal conditions within a given cell may change, whereby an access terminal may be better served by another access point. In these cases, to maintain mobility for the access terminal, the access terminal may be handed-over from its serving access point to the other access point. In some cases, an access terminal may be directed to another network (e.g., which may uniquely provide a desired service or better service).

SUMMARY

In accordance with an aspect of the disclosure, a method for wireless communication comprises providing a message from a first network to a device, wherein the message comprises one or more parameters for access to a second network, directing the device to switch from the first network to the second network based on the one or more parameters provided by the first network, and directing the device to perform random access on the second network based at least in part on the one or more parameters provided by the first network, wherein the one or more parameters comprise a priority parameter for performing random access on the second network.

In accordance with an aspect of the disclosure, an apparatus for wireless communication comprises a processing system configured to provide a message from a first network to a device, wherein the message comprises one or more parameters for access to a second network, direct the device to switch from the first network to the second network based on the one or more parameters provided by the first network, and direct the device to perform random access on the second network based at least in part on the one or more parameters provided by the first network, wherein the one or more parameters comprise a priority parameter for performing random access on the second network.

In accordance with an aspect of the disclosure, an apparatus for wireless communication comprises means for providing a message from a first network to a device, wherein the message comprises one or more parameters for access to a second network, means for directing the device to switch from the first network to the second network based on the one or more parameters provided by the first network, and means for directing the device to perform random access on the second network based at least in part on the one or more parameters provided by the first network, wherein the one or more parameters comprise a priority parameter for performing random access on the second network.

In accordance with an aspect of the disclosure, a computer program product comprises a computer-readable medium comprising code executable to cause an apparatus to provide a message from a first network to a device, wherein the message comprises one or more parameters for access to a second network, direct the device to switch from the first network to the second network based on the one or more parameters provided by the first network, and direct the device to perform random access on the second network based at least in part on the one or more parameters provided by the first network, wherein the one or more parameters comprise a priority parameter for performing random access on the second network.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1:
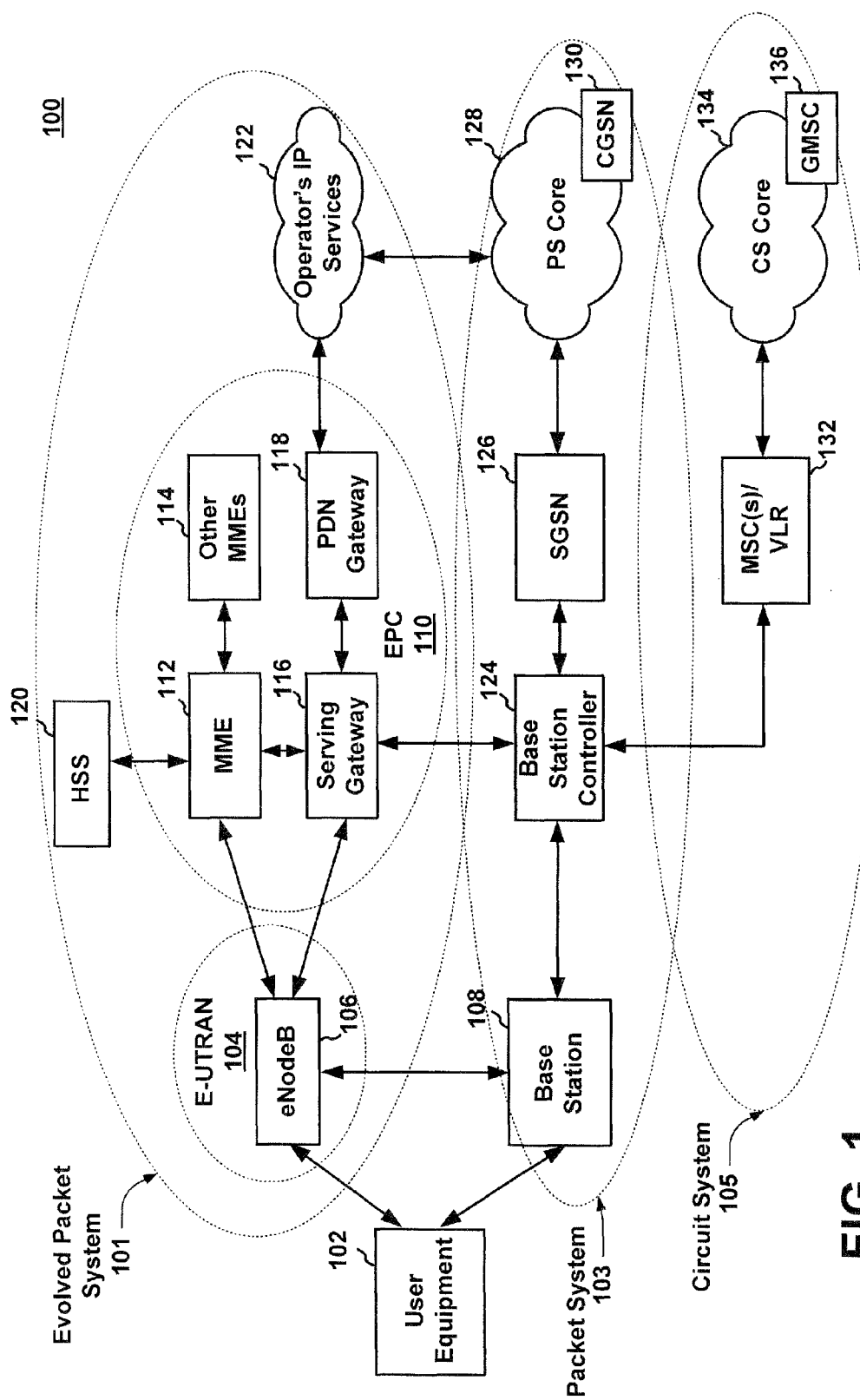
FIG. 1 shows a diagram illustrating a wireless communication network, in accordance with aspects of the disclosure.

In accordance with common practice the various features illustrated in the drawings may not be drawn to scale. Accordingly, dimensions of various features may be arbitrarily expanded or reduced for clarity. In addition, some of the drawings may be simplified for clarity. Therefore, the drawings may not depict all of the components of a given apparatus (e.g., device) or method.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented utilizing electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The teachings described herein may be incorporated into various types of communication systems and/or system components. In some aspects, the teachings described herein may be employed in a multiple-access system capable of supporting communication with multiple users by sharing the available system resources (e.g., by specifying one or more of bandwidth, transmit power, coding, interleaving, etc.).

The techniques described herein may be utilized for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often utilized interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is utilized in much of the description below. Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Re10, RevA, RevB) technology and other technologies.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In an aspect of the disclosure, a wireless multiple-access communication system is configured to simultaneously support communication for multiple wireless terminals. Each terminal communicates with one or more base stations via transmissions on the forward and reverse links. The forward link or downlink (DL) refers to the communication link from the base stations to the terminals, and the reverse link or uplink (UL) refers to the communication link from the terminals to the base stations. This communication link may be established via a single-in-single-out, multiple-in-single-out, or a multiple-in-multiple-out (MIMO) system.

In an aspect of the disclosure, a MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

In an aspect of the disclosure, a MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

FIG. 1 is a diagram illustrating a wireless network architecture 100 employing various apparatuses. The network architecture 100 may include an Evolved Packet. System (EPS) 101. The EPS 101 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS may interconnect with other access networks, such as a packet switched core (PS core) 128, a circuit switched core (CS core) 134, etc. As shown, the EPS provides packet-switched services, however, as those skilled in the art will readily appreciate, the various concepts presented throughout this disclosure may be extended to networks providing circuit-switched services, such as the network associated with CS core 134.

The network architecture 100 may further include a packet switched network 103 and a circuit switched network 105. In an implementation, the packet switched network 103 may include base station 108, base station controller 124, Serving GPRS Support Node (SGSN) 126, PS core 128 and Combined GPRS Service Node (CGSN) 130. In another implementation, the circuit switched network 105 may include base station 108, base station controller 124, Mobile Switching Centre (MSC), Visitor location register (VLR) 132, CS core 134 and Gateway Mobile Switching Centre (GMSC) 136.

The E-UTRAN 104 may include an evolved Node B (eNB) 106 and connection to other networks, such as packet and circuit switched networks may be facilitated through base station 108. The eNB 106 provides user and control plane protocol terminations toward the UE 102. The eNB 106 may be connected to the other eNBs 108 via an X2 interface (i.e., backhaul). The eNB 106 may also be referred to by those skilled in the art as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 include the Internet, the Intranet, an IP Multimedia Subsystem (IMS), and a PS Streaming Service (PSS).

In an aspect of the disclosure, the wireless system 100 may be enabled to facilitate CS fallback (CSFB). As used herein, CSFB may refer to establishing a signaling channel between a circuit switched MSC 132 and the LTE core network 110 to allow for services, such as voice calls, short message service (SMS), etc. In such an aspect, CSFB may be enabled when a UE 102 is associated with EPS 101 (e.g., camped on the LTE network 101) and registered to receive pages for mobile terminated (MT) calls on the LTE network 101. In operation, the UE 102 may receive a page on the LTE network 101. Thereafter, the UE 102 may be transitioned by the LTE network 101 to a CS based cell 108 (e.g., a UTRAN cell, GERAN cell, etc.) to perform CS call setup. In an implementation, CS call setup may be performed using a page response message. As implemented through a LTE network 101, CSFB may be different from legacy CS call set up on native CS based cells 108 (e.g., UTRAN/GERAN) in that the UE 102 may receive a page for an MT call on one cell and may respond to the page on another cell.

Generally, while camped on the LTE network 101, a CSFB capable UE 102 may be attached to a 3GPP MSC 132. This 3GPP MSC 132 may serve a first location area, e.g. LA1. As noted above, MT CSFB call processing may involve the UE being moved from LTE network 101, where a page was received, to CS based cell 108 (e.g., a UTRAN cell, GERAN cell, etc.) where a page response may be sent.

In an aspect of the disclosure, it may be desirable for a cellular system to deliver a page to a previously idle UE in its coverage, which may cause the UE to perform a random access procedure, while granting the resulting access procedure a higher priority than other access attempts. For example, these situations may occur in a widespread emergency situation, such as a natural disaster, when load on the system is extremely high and when there are compelling reasons to prioritize service to certain users, such as emergency responders.

When the paging procedure and the random access take place within the same system, there are suitable methods for achieving prioritization, such as, for example, via access class barring, selective throttling of lower-priority paging messages at the network, etc. However, if paging and access procedures take place on different networks, the paging network may not be aware of the loading conditions on the other network, and may have no mechanism to indicate directly to the other network that the resulting access attempt should be given high priority. Such a situation may arise, for example, when an LTE system triggers a "CS fallback" (CSFB) behaviour, causing the UE in service in the LTE network to move to a network of another radio access technology, such as UMTS or GSM, to originate a high-priority communication.

Therefore, aspects of the disclosure provide a class of signalling solutions that allow access attempts of the type described to be given high priority. For example, consider a UE that is in service on a source system. The UE may be brought into a connected or active state on the source system, then directed by dedicated signalling to perform access on a different target system. In an implementation, the source system may be an LTE system, and the target system may be a system of a different access technology, such as UMTS or GSM, and the dedicated signalling may be a redirection message comprising one or more parameters that have the effect of directing the UE to move or switch to the target system and perform a random access procedure to enter into a connected or active state in the target system. In an example, this procedure is shown (at a high level) in FIG. 8.

In an aspect of the disclosure, to facilitate treatment by the target system of the access attempt as high priority, the redirection message sent from the source system may include the capability to include parameters that affect the handling of the access attempt. For example, the redirection message may include an indication of an access class or access service class to be used by the UE in the target system. Such classes exist in some cellular technologies and have an effect of assigning access attempts to particular radio resources (e.g., by mapping access service classes to particular RACH resources in UMTS) or of allowing UEs with certain access classes to bypass restrictions, such as access class barring. These classes may be associated statically with a particular UE and/or assigned by the serving network (i.e., the same network in which they may be used; for our discussion this is the target network). However, the class(es) assigned by the source system may be configured to override the normal methodologies for determining the class(es) associated with the UE in the target system.

In an aspect of the disclosure, the redirection message may include a cause value to be delivered as part of the access attempt in the target system (e.g., a value to be used in the information element "Establishment cause" in a UMTS system). Such a value may have semantics defined by the target system, although it would be delivered over the air to the UE by the target system. It is contemplated that various values may be used, including the possibility of using multiple cause values for different types of prioritised access; e.g., a source network could indicate to some UEs that their access attempts on the target system should be identified as emergency calls, and to others that their access attempts on the target system should be identified as high-priority signalling requests. Various values may be used to partition different groups of prioritized users (e.g., one value for emergency responders and another value for operator employees, both of whom may be granted priority in many situations, but who may be distinguishable from one another by the target system).

Aspects of the disclosure are configured to modify CSFB-with-redirection functionality. In the examples described, appropriate values and any related policies for setting parameters conveyed by a redirection message may be provided by the target network to the source network, e.g., via an interworking interface. For example, the target network may provide to the source network one or more cause values to be used for various classes of prioritised CS fallback (CSFB).

Figure 2:
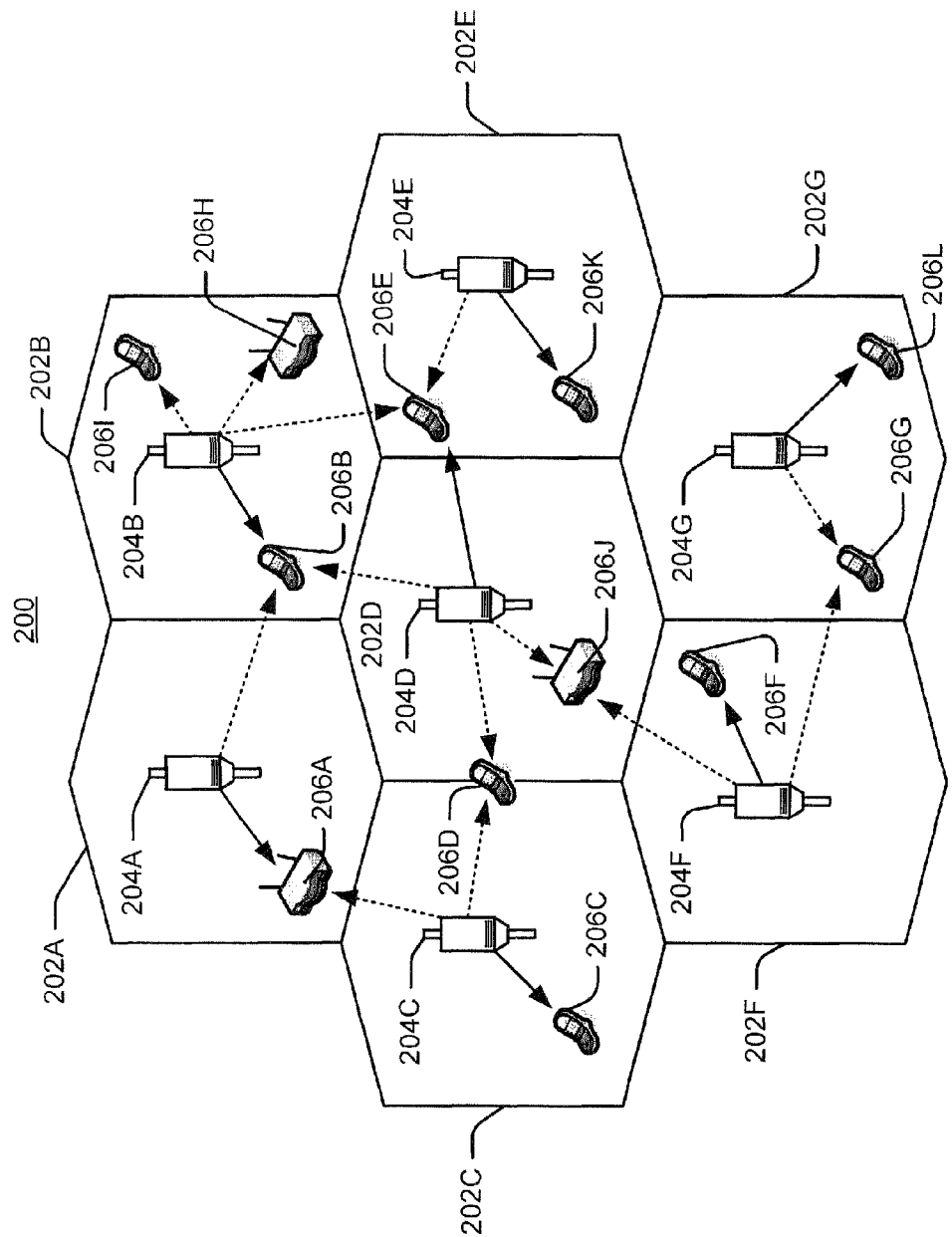
FIG. 2 shows a diagram of a wireless communication system, in accordance with aspects of the disclosure.

FIG. 2 illustrates a wireless communication system 200, configured to support a number of users, in which the teachings herein may be implemented. The system 200 provides communication for multiple cells 202, such as, for example, macro cells 202A-202G, with each cell being serviced by a corresponding access point 204 (e.g., access points 204A-204G). As shown in FIG. 2, access terminals 206 (e.g., access terminals 206A-206L) may be dispersed at various locations throughout the system over time. Each access terminal 206 may communicate with one or more access points 204 on a forward link (FL) and/or a reverse link (RL) at a given moment, depending upon whether the access terminal 206 is active and whether it is in soft handoff, for example. The wireless communication system 200 may provide service over a large geographic region. For example, macro cells 202A-202G may cover a few blocks in a neighborhood or several miles in rural environment.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 2rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The access points 204A-204G may have multiple antennas supporting MIMO technology. The use of MIMO technology enables the access points 204A-204G to exploit the spatial domain to support spatial multiplexing, beamforming, and transmit diversity. The access points 204A-204G may comprise eNB devices.

Spatial multiplexing may be used to transmit different streams of data simultaneously on the same frequency. The data steams may be transmitted to a single access terminal 206A-206L to increase the data rate or to multiple access terminals 206A-206L to increase the overall system capacity. This is achieved by spatially precoding each data stream and then transmitting each spatially precoded stream through a different transmit antenna on the downlink. The spatially precoded data streams arrive at the access terminals 206A-206L with different spatial signatures, which enables each of the access terminals 206A-206L to recover the one or more data streams destined for that access terminal 206A-206L. On the uplink, each access terminal 206A-206L transmits a spatially precoded data stream, which enables the access points 204A-204G to identify the source of each spatially precoded data stream. The access terminals 206A-206L may be referred to as User Equipment (UE) devices.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Figure 3:
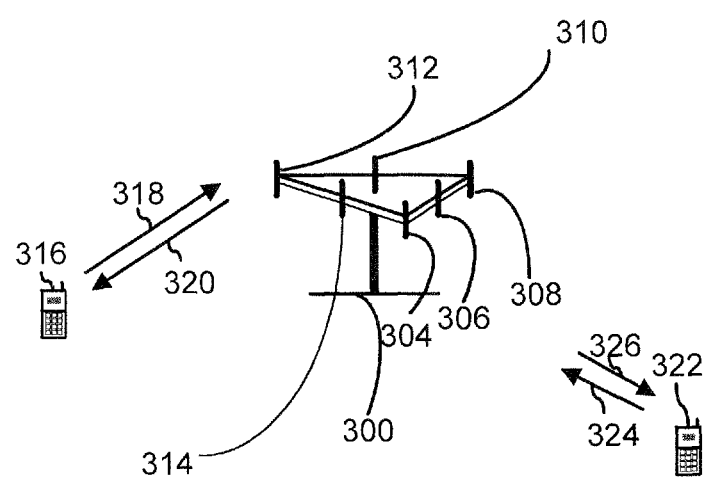
FIG. 3 shows a diagram illustrating an embodiment of a multiple access wireless communication system, in accordance with aspects of the disclosure.

FIG. 3 shows a diagram illustrating an embodiment of a multiple access wireless communication system, in accordance with aspects of the disclosure. In an implementation, an access point (AP) 300 includes one or more antenna groups, for example, one including 304 and 306, another including 308 and 310, and an additional including 312 and 314. In FIG. 3, only two antennas are shown for each antenna group; however, more or fewer antennas may be utilized for each antenna group. The access terminal 316 (AT) is in communication with the antennas 312 and 314, where the antennas 312 and 314 transmit information to the access terminal 316 over the forward link or downlink (DL) 320 and receive information from the access terminal 316 over the reverse link or uplink (UL) 318. The access terminal 322 is in communication with the antennas 306 and 308, where the antennas 306 and 308 transmit information to the access terminal 322 over the forward link or downlink (DL) 326 and receive information from the access terminal 322 over the reverse link or uplink (UL) 324.

In an aspect of the disclosure, in a frequency division duplexing (FDD) system, the communication links 318, 320, 324 and 326 may use different frequency for communication. For example, the forward link or downlink (DL) 320 may use a different frequency then that utilized by the reverse link or uplink (UL) 318.

In an aspect of the disclosure, each group of antennas and/or the area in which they are designed to communicate may be referred to as a sector of the access point. In an example, each antenna group may be designed to communicate to access the terminals in a sector of the areas covered by the access point 300.

When communicating over the forward links or downlinks (DLs) 320, 326, the transmitting antennas of the access point 300 utilize beamforming to improve a signal-to-noise ratio of the forward links or downlinks 320, 326 for the different access terminals 316 and 324, respectively. Also, an access point utilizing beamforming to transmit to access terminals scattered randomly through its coverage causes less interference to access terminals in neighboring cells than an access point transmitting through a single antenna to all its access terminals.

In accordance with aspects of the disclosure, an access point may comprise a fixed station utilized for communicating with the terminals and may be referred to as an access point (AP), a Node B (NB), evolved Node B (eNB), or some other terminology. An access terminal may be referred to as an access terminal (AT), user equipment (UE), a wireless communication device, terminal, or some other terminology. Moreover, an access point may be a macrocell access point, femtocell access point, picocell access point, and/or the like.

In various embodiments, as described herein, one or more segments or one or more extension carriers may be linked to a regular carrier resulting in a composite bandwidth over which the UE may transmit information to, and/or receive information from, the eNB.

In the description that follows, various aspects of an access network will be described with reference to a MIMO system supporting OFDM on downlink (DL) and SC-FDMA on uplink (UL). OFDM is a spread-spectrum technique that modulates data over a number of subcarriers within an OFDM symbol. The subcarriers are spaced apart at precise frequencies. The spacing provides "orthogonality" that enables a receiver to recover data from subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4A:
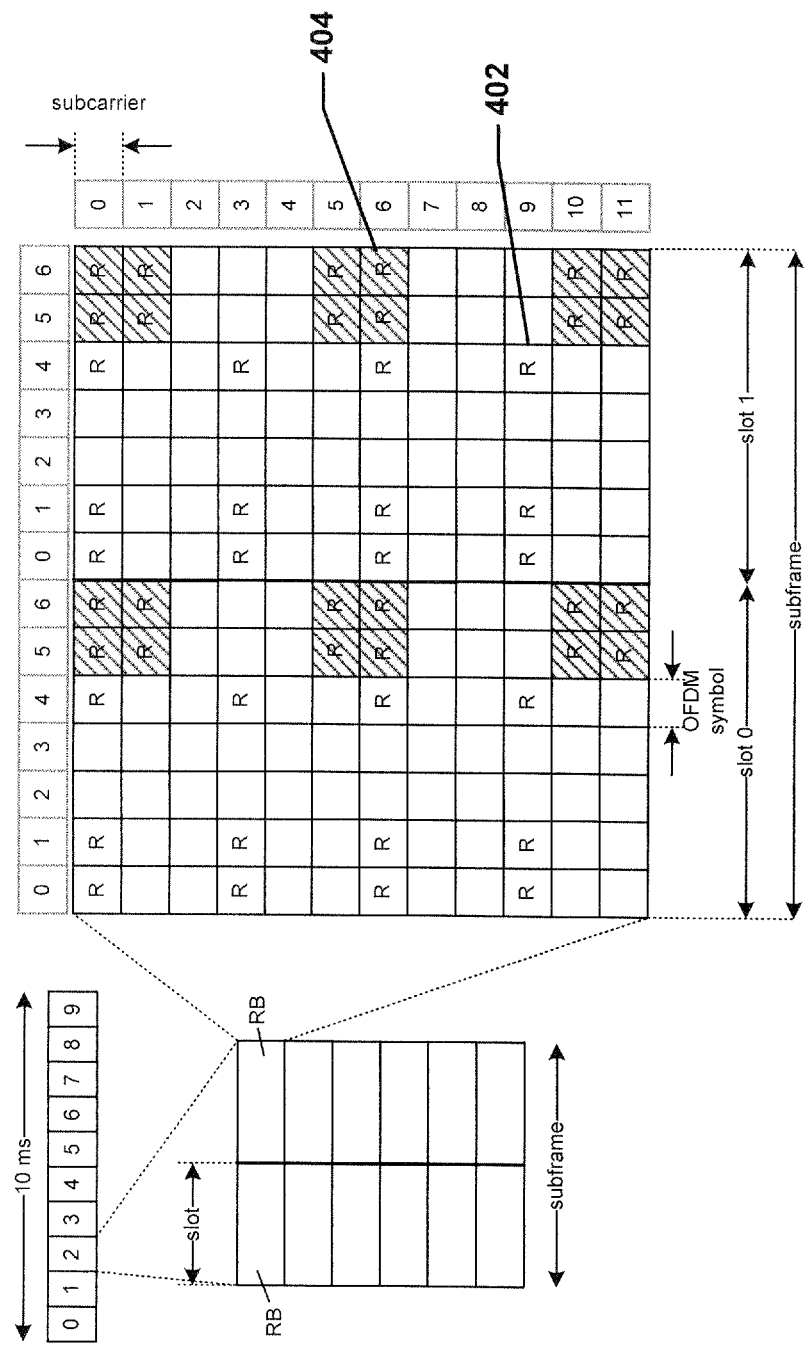
FIG. 4A shows a diagram illustrating an example of a frame structure for use in an access network, in accordance with aspects of the disclosure.

In accordance with aspects of the disclosure, various frame structures may be utilized to support downlink (DL) and uplink (UL) transmissions. An example of a DL frame structure will now be presented with reference to FIG. 4A. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

In an implementation, a resource grid may be utilized to represent two time slots, each time slot including a Resource Block (RB). The resource grid is divided into multiple Resource Elements (REs). In LTE, a Resource Block (RB) may include 12 consecutive subcarriers in the frequency domain and, for a normal cyclic prefix in each OFDM symbol, 7 consecutive OFDM symbols in the time domain, or 84 Resource Elements (REs). Some of the REs, as indicated as R 402 and 404, may include DL Reference Signals (DL-RS). The DL-RS include Cell-specific RS (CRS) (which may be referred to as common RS) 402 and UE-specific RS (UE-RS) 404. UE-RS 404 may be transmitted only on the RBs upon which a corresponding Physical Downlink Shared CHannel (PDSCH) is mapped. The number of bits carried by each RE may depend on the modulation scheme. As such, the more RBs that a UE receives and the higher the modulation scheme, the higher the data rate for the UE.

Figure 4B:
FIG. 4B shows a format for an uplink (UL) in a Long Term Evolution (LTE) network, in accordance with aspects of the disclosure.

Referring to FIG. 4B, an example of a UL frame structure 420 is provided in an embodiment of a format for the UL in LTE. Available Resource Blocks (RBs) for the UL may be partitioned into a data section and a control section. The control section may be formed at the two edges of the system bandwidth and may have a configurable size. The RBs in the control section may be assigned to UEs for transmission of control information. The data section may include RBs not included in the control section. The design in FIG. 4B results in the data section including contiguous subcarriers, which may allow a single UE to be assigned one or more of the contiguous subcarriers in the data section.

In an implementation, a UE may be assigned Resource Blocks (RBs) 430a, 430b in a control section to transmit control information to an eNB. The UE may be assigned RBs 440a, 440b in a data section to transmit data to the eNB. The UE may transmit control information in a Physical Uplink Control CHannel (PUCCH) on the assigned RBs in the control section. The UE may transmit only data or both data and control information in a Physical Uplink Shared CHannel (PUSCH) on the assigned RBs in the data section. A UL transmission may span both slots of a subframe and may hop across frequency, in a manner as shown in FIG. 4B.

In an aspect of the disclosure, referring to FIG. 4B, a set of RBs may be utilized to perform initial system access and achieve UL synchronization in a Physical Random Access CHannel (PRACH) 450. The PRACH 450 is configured to carry a random sequence and cannot carry any UL data/signaling. Each random access preamble occupies bandwidth corresponding to six consecutive RBs. The starting frequency may be specified by the network. That is, the transmission of the random access preamble is restricted to certain time and frequency resources. There is no frequency hopping for the PRACH. The PRACH attempt is carried in a single subframe (1 ms), and a UE may make only a single PRACH attempt per frame (10 ms).

In an aspect of the disclosure, it should be appreciated that the PUCCH, PUSCH, and PRACH in LTE are described in reference to 3GPP TS 36.211, entitled "Evolved Universal Terrestrial Radio Access (E-UTRA); Physical Channels and Modulation," which is publicly available.

Figure 4C:
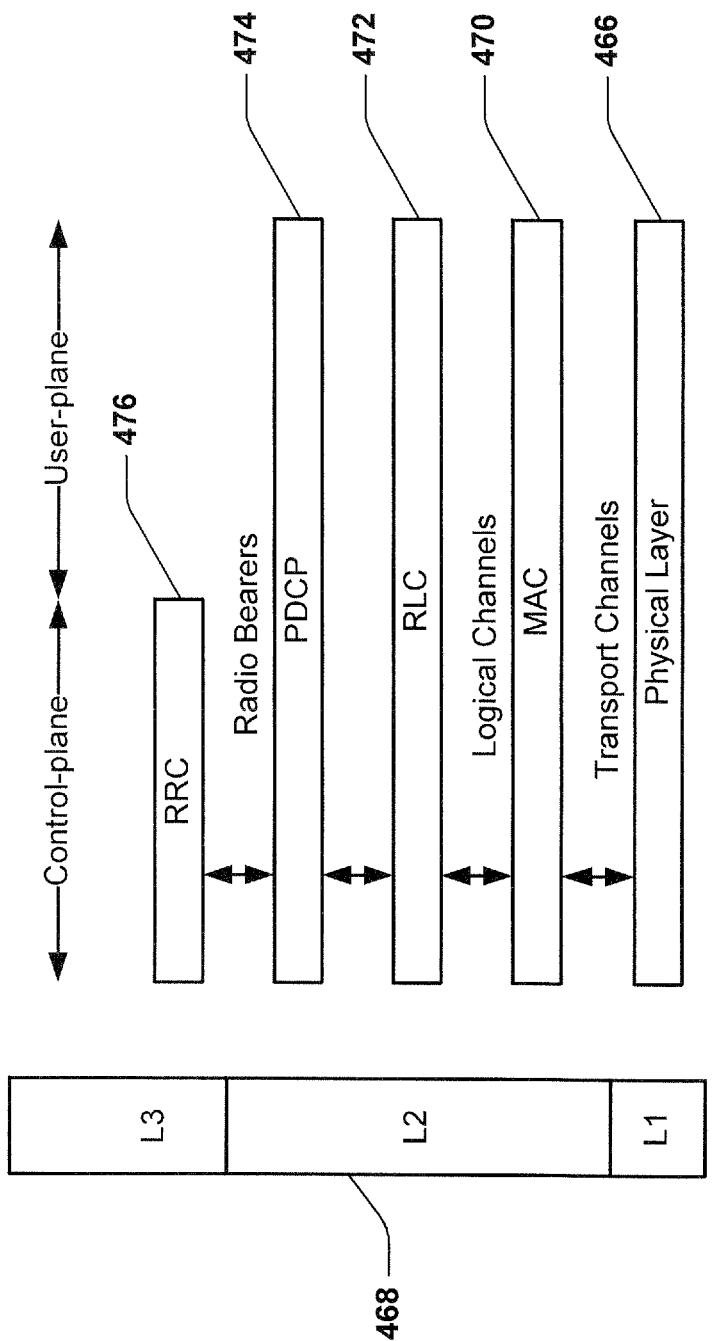
FIG. 4C shows a diagram illustrating an example of a radio protocol architecture for the user and control plane, in accordance with aspects of the disclosure.

The radio protocol architecture may take on various forms depending on the particular application. An example for an LTE system will now be presented with reference to FIG. 4C. In an aspect of the disclosure, FIG. 4C is a diagram illustrating an example of the radio protocol architecture for the user and control planes. Referring to FIG. 4C, the radio protocol architecture for the UE and the eNB is shown with three layers: Layer 1 (L1), Layer 2 (L2), and Layer 3 (L3). L1 is the lowest layer and implements various physical layer signal processing functions. L1 is referred to herein as a physical layer 466. L2 468 is above the physical layer (L1) 466 and is responsible for the link between the UE and eNB over the physical layer (L1) 466.

In the user plane, the L2 layer 468 includes a media access control (MAC) sublayer 470, a radio link control (RLC) sublayer 472, and a Packet Data Convergence Protocol (PDCP) 474 sublayer, which are terminated at the eNB on the network side. Although not shown, the UE may have several upper layers above the L2 layer 468 including a network layer (e.g., IP layer) that is terminated at the PDN gateway 118 (e.g., see FIG. 1) on the network side, and an application layer that is terminated at the other end of the connection (e.g., far end UE, server, etc.).

In an aspect of the disclosure, the PDCP sublayer 474 provides multiplexing between different radio bearers and logical channels. The PDCP sublayer 474 may provide header compression for upper layer data packets to reduce radio transmission overhead, security by ciphering the data packets, and/or handover support for UEs between eNBs. The RLC sublayer 472 provides segmentation and reassembly of upper layer data packets, retransmission of lost data packets, and/or reordering of data packets to compensate for out-of-order reception due to Hybrid Automatic Repeat Request (HARQ). The MAC sublayer 470 provides multiplexing between logical and transport channels, and the MAC sublayer 470 is responsible for allocating the various radio resources (e.g., RBs) in one cell among the UEs. The MAC sublayer 470 is responsible for HARQ operations.

In the control plane, the radio protocol architecture for the UE and eNB is substantially the same for the physical layer 466 and the L2 layer 468 with the exception that there is no header compression function for the control plane. The control plane includes a Radio Resource Control (RRC) sublayer 476 in Layer 3. The RRC sublayer 476 is responsible for obtaining radio resources (i.e., radio bearers) and for configuring the lower layers utilizing RRC signaling between the eNB and the UE.

Figure 5:
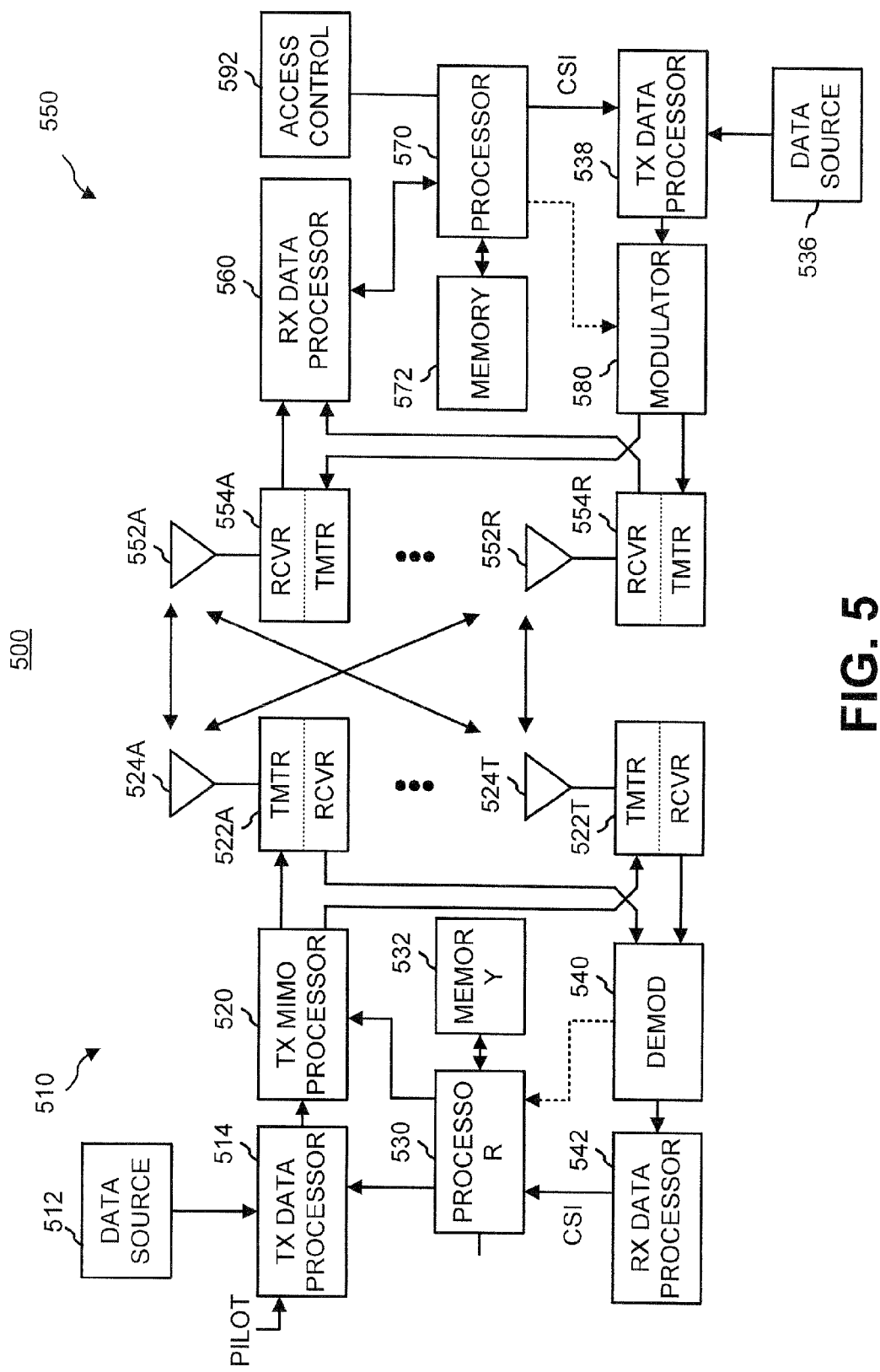
FIG. 5 shows a block diagram of several sample aspects of communication components, in accordance with aspects of the disclosure.

FIG. 5 illustrates a wireless device 510 (e.g., an access point) and a wireless device 550 (e.g., an access terminal) of a sample MIMO system 500. At the device 510, traffic data for a number of data streams is provided from a data source 512 to a transmit (TX) data processor 514. Each data stream may then be transmitted over a respective transmit antenna.

The TX data processor 514 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 530. A data memory 532 may store program code, data, and other information used by the processor 530 or other components of the device 510.

The modulation symbols for all data streams are then provided to a TX MIMO processor 520, which may further process the modulation symbols (e.g., for OFDM). The TX MIMO processor 520 then provides $N_T$ modulation symbol streams to $N_T$ transceivers (XCVR) 522A through 522T. In some aspects, the TX MIMO processor 520 applies beamforming weights to the symbols of the data streams and to the antenna from which the symbol is being transmitted.

Each transceiver 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 522A through 522T are then transmitted from $N_T$ antennas 524A through 524T, respectively.

At the device 550, the transmitted modulated signals are received by $N_R$ antennas 552A through 552R and the received signal from each antenna 552 is provided to a respective transceiver (XCVR) 554A through 554R. Each transceiver 554 conditions (e.g., filters, amplifies, and downconverts) a respective received signal, digitizes the conditioned signal to provide samples, and further processes the samples to provide a corresponding "received" symbol stream.

In an aspect of the disclosure, a receive (RX) data processor 560 then receives and processes the $N_R$ received symbol streams from $N_R$ transceivers 554 based on a particular receiver processing technique to provide $N_T$ "detected" symbol streams. The RX data processor 560 then demodulates, deinterleaves, and decodes each detected symbol stream to recover the traffic data for the data stream. The processing by the RX data processor 560 is complementary to that performed by the TX MIMO processor 520 and the TX data processor 514 at the device 510.

In an aspect of the disclosure, a processor 570 periodically determines which pre-coding matrix to use (discussed below). The processor 570 formulates a reverse link message comprising a matrix index portion and a rank value portion. A data memory 572 may store program code, data, and other information used by the processor 570 or other components of the device 550.

In an aspect of the disclosure, the reverse link message may comprise various types of information regarding the communication link and/or the received data stream. The reverse link message is then processed by a TX data processor 538, which also receives traffic data for a number of data streams from a data source 536, modulated by a modulator 580, conditioned by the transceivers 554A through 554R, and transmitted back to the device 510.

At the device 510, the modulated signals from the device 550 are received by the antennas 524, conditioned by the transceivers 522, demodulated by a demodulator (DEMOD) 540, and processed by a RX data processor 542 to extract the reverse link message transmitted by the device 550. The processor 530 then determines which pre-coding matrix to use for determining the beam-forming weights then processes the extracted message.

FIG. 5 also illustrates that the communication components may include one or more components that perform access control-related operations as described herein. For example, an access control component 592 may cooperate with the processor 530 and/or other components of the device 550 to facilitate access to another network (e.g., via device 510) as described herein. It should be appreciated that for each device 510 and 550 the functionality of two or more of the described components may be provided by a single component. For example, a single processing component may provide the functionality of the access control component 592 and the processor 570.

Figure 6:
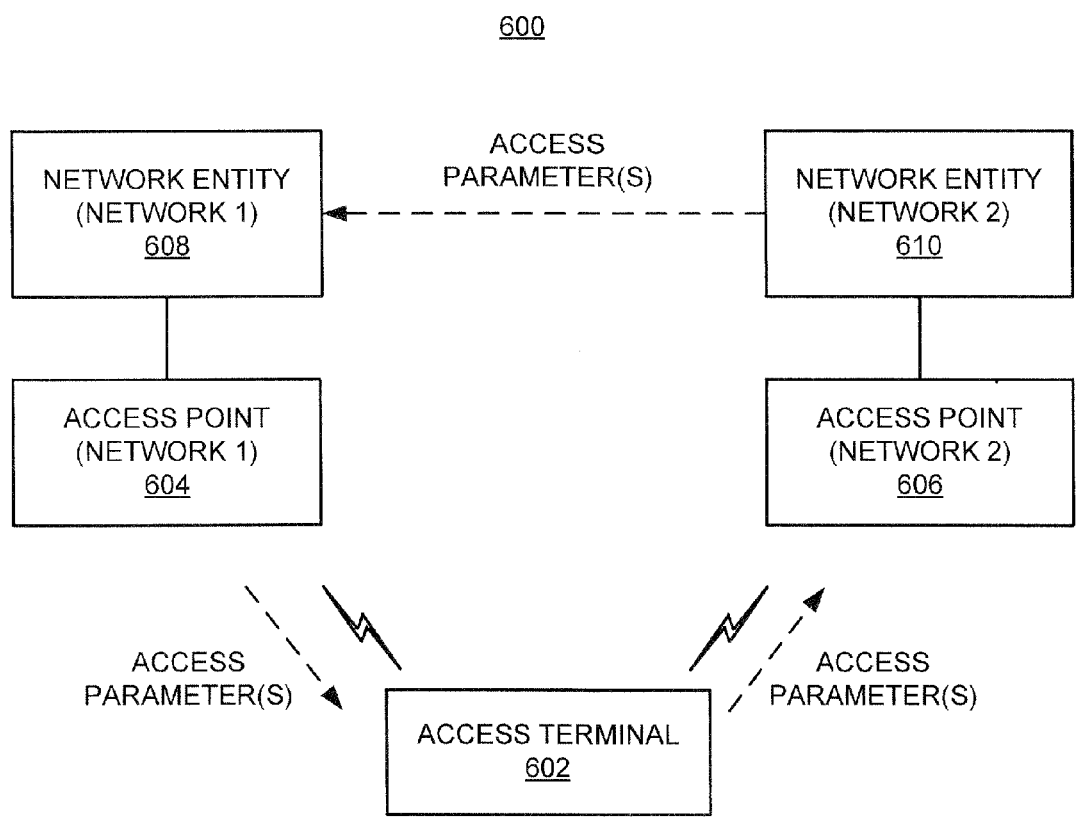
FIG. 6 shows a block diagram of several sample aspects of a communication system adapted to use access parameters, in accordance with aspects of the disclosure.

FIG. 6 illustrates a sample communication system 600 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, cells, and so on, while access terminals may be referred to or implemented as user equipment, mobile devices, and so on.

Access points in the system 600 provide one or more services (e.g., network connectivity) for one or more wireless terminals (e.g., access terminal 602) that may be installed within or that may roam throughout a coverage area of the system 600. For example, at various points in time the access terminal 602 may connect to an access point 604, an access point 606, or some other access point in the system 600 (not shown). Each of the access points may communicate with one or more network entities (represented, for convenience, by network entities 608 and 610) to facilitate wide area network connectivity. In the example of FIG. 6, the access point 604 is associated with a first network (via network entity 608) and the access point 606 is associated with a second network (via network entity 610).

A network entity may take various forms such as, for example, one or more radio and/or core network entities. Thus, in various implementations the network entity may represent functionality such as at least one of: network management (e.g., via an operations, administration, and maintenance (OAM) entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for the access terminals; and providing access control for access terminals. Also, two or more of these network entities may be co-located or these entities may be distributed throughout the network.

In accordance with the teachings herein, the first network (network 1) may send one or more access parameters to the access terminal 602 that the access terminal 602 may, in turn, send to the second network (network 2) when the access terminal 602 accesses the second network. In some aspects, an access parameter may be used to enable priority access for the access terminal 602 at the second network. For example, if the first network redirects the access terminal 602 to the second network (e.g., in conjunction with a circuit switch fallback procedure), the first network may send access priority parameters with the redirection message. Then, when the access terminal 602 accesses the second network, the access terminal 602 may send these access parameters to the second network. The second network may then provide priority access to the access terminal 602 (e.g., higher priority access than is provided to one or more other access terminals) based on the received parameters. Thus, in some aspects, the disclosure may relate to performing high-priority random access to a cellular system based on parameters supplied in redirection from a different system.

In some cases, the first network may receive the access parameters from the second network. For example, the network entity 610 may send access parameters to the network entity 608 via a configuration interface.

The network access parameter-related operations taught herein may be performed by various components of the network. For example, in some implementations a network entity such as a mobility manager (e.g., a mobility management entity (MME)) may perform these operations.

Figure 7:
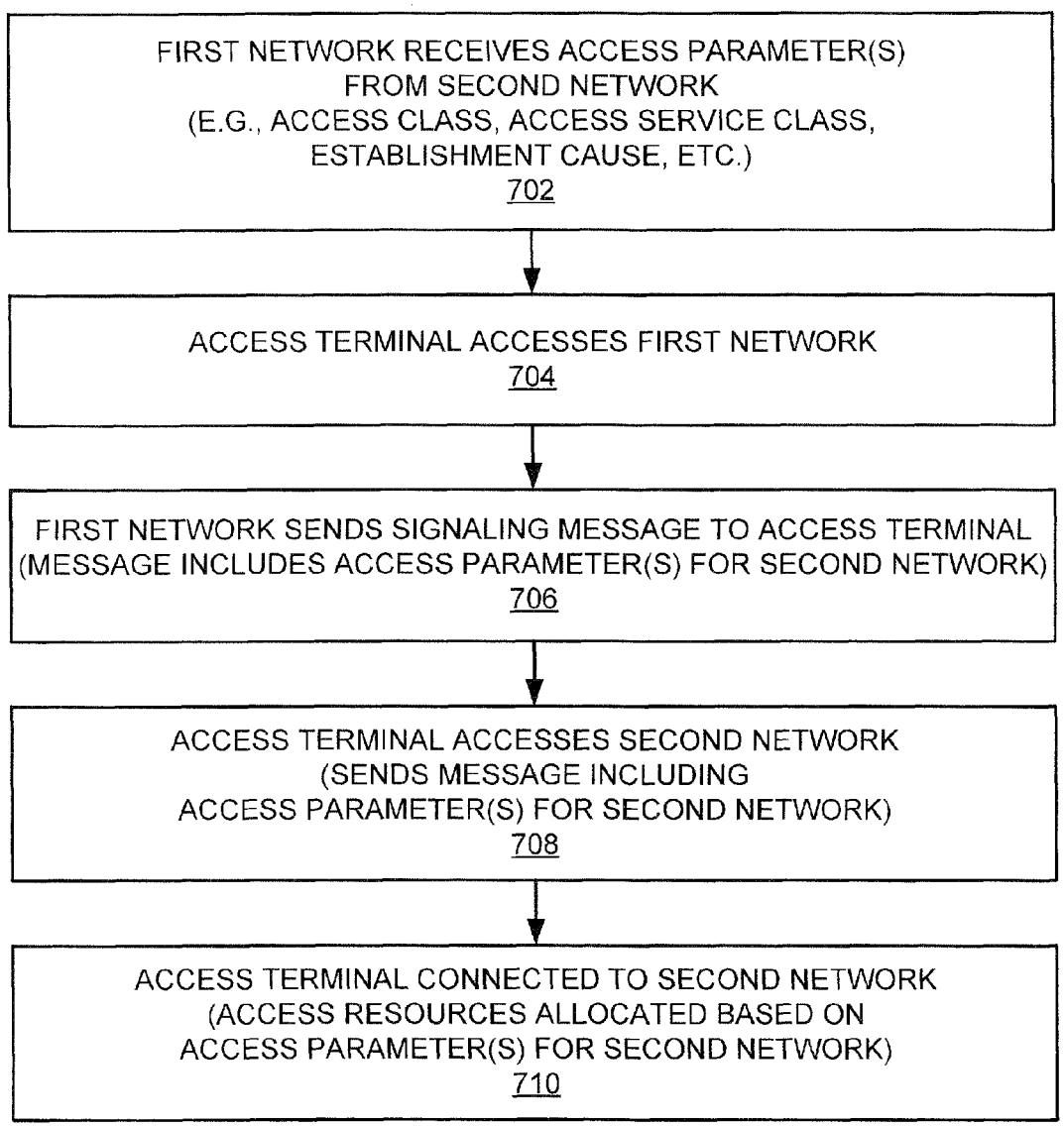
FIG. 7 shows a flowchart of several sample aspects of operations that may be performed in conjunction with the use of access parameters, in accordance with aspects of the disclosure.
Figure 8:
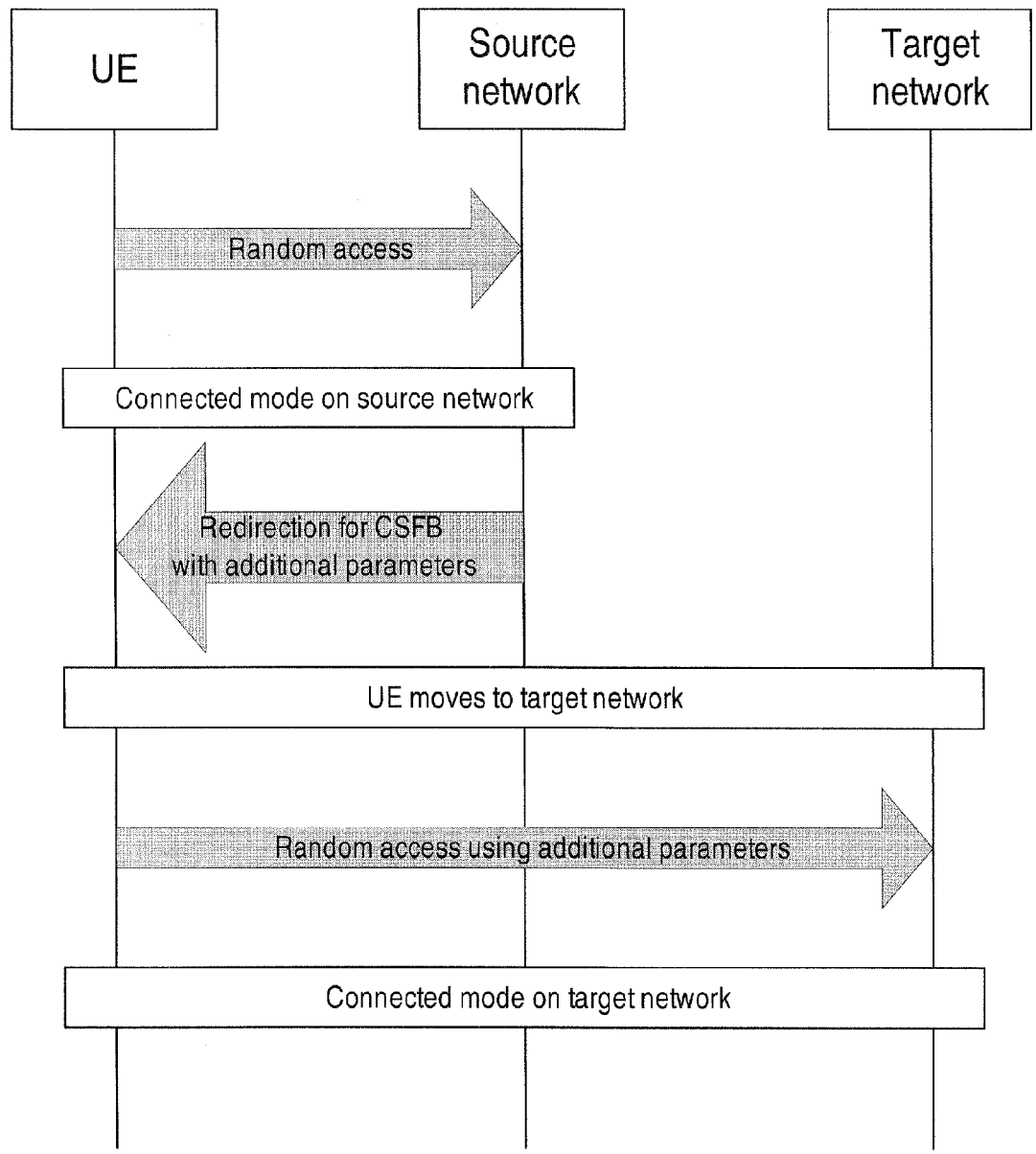
FIG. 8 shows a sample call flow diagram illustrating how access parameters may be employed in conjunction with redirection of an access terminal, in accordance with aspects of the disclosure.
Figure 9A:
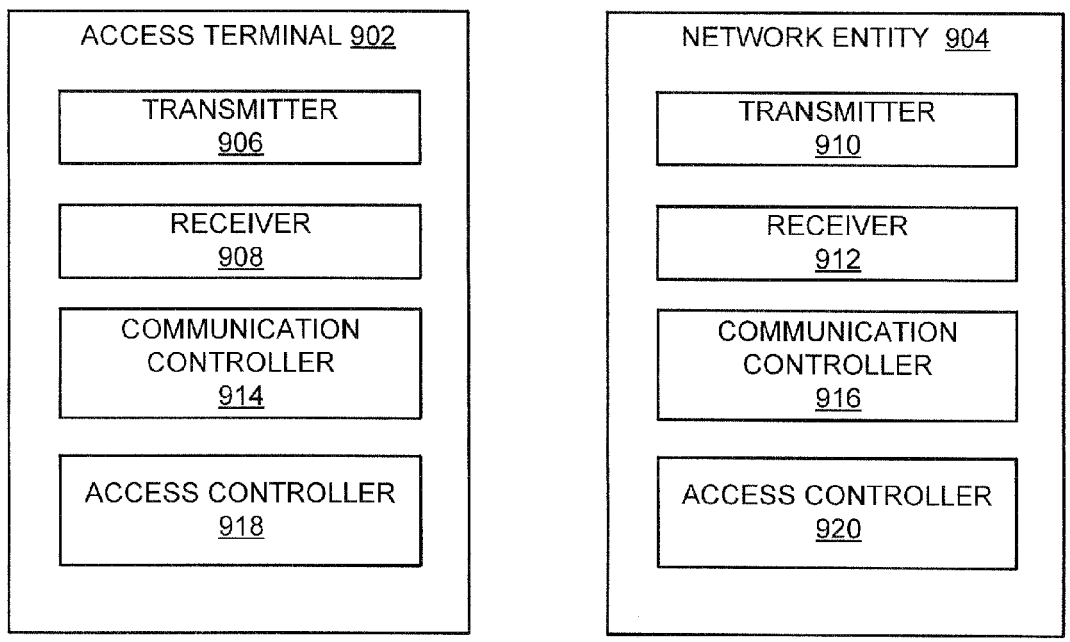
FIG. 9A shows a diagram illustrating components that may be employed in communication nodes, in accordance with aspects of the disclosure.
Figure 9B:
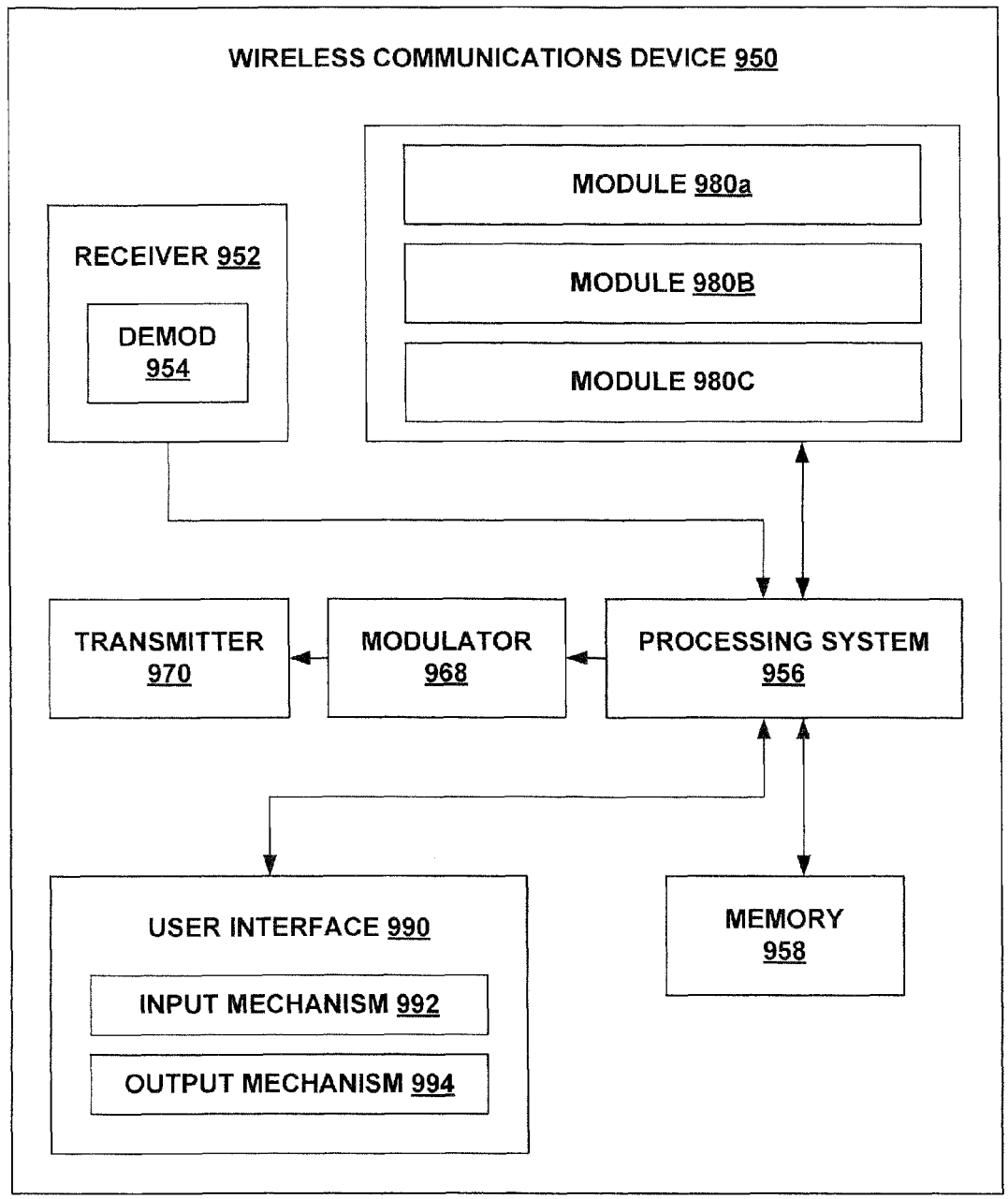
FIG. 9B shows a diagram illustrating an embodiment of a hardware implementation for an apparatus employing a processing system and a memory, in accordance with aspects of the disclosure.

In aspects of the disclosure, sample access parameter-related operations are described in conjunction with FIGS. 7 and 8. In various implementations, operations of FIGS. 7 and 8 (or any other operations discussed or taught herein) may be described as being performed by specific components (e.g., components as shown in FIGS. 6, 9A, and 9B). It should be appreciated, however, that these operations may be performed by other types of components and may be performed using a different number of components. It also should be appreciated that one or more of the operations described herein may not be employed in a given implementation.

In an aspect of the disclosure, as represented by block 702 of FIG. 7, at some point in time a first network (i.e., a first network entity of the first network) receives one or more access parameters associated with a second network. Here, an access parameter may comprise an indication (explicitly or implicitly) of a priority that may be assigned to the access terminal in the event the access terminal accesses the second network. That is, the second network provides access at different priorities to different access terminals. To facilitate this access priority scheme, the second network associates certain access parameters with certain priorities. For example, an access parameter may comprise at least one of: an access class, an access service class, or an establishment cause. At the second network, then, different values of these parameters are associated with different priorities.

In addition, in some cases the second network maintains an association between the access parameter(s) and a plurality of classes of access terminals. In such cases, the first network may receive indication of this association in conjunction with the receipt of the access parameter(s) (e.g., via the same message).

The access parameter information may be provided to the first network in various ways. In some implementations, the second network (i.e., a network entity of the second network) sends the information to the first network (e.g., to a network entity of the first network). For example, the first network may receive the access parameter information from the second network via a configuration interface.

As represented by block 704, at some later point in time, an access terminal associated with access parameter(s) accesses the first network. For example, the access terminal may connect to an access point associated with the first network.

As represented by block 706, the first network may send a signaling message to the access terminal, whereby the signaling message includes one or more access parameters associated with that access terminal. For example, in the event the first network determines that the access terminal should be redirected to the second network, the first network may send a redirection message to the access terminal. Here, the redirection message may include access parameters that specify the priority the access terminal is to receive at the second network.

As represented by block 708, the access terminal accesses the second network (e.g., as a result of receiving the signaling message). For example, the access terminal may perform a random access at an access point associated with the second network. In conjunction with this access, the access terminal sends a message to the second network, whereby the message includes the access parameter(s) that the access terminal received at block 706.

As represented by block 710, as a result of receiving the access parameter(s) from the access terminal, the second network provides access to the access terminal based on the access parameter(s). For example, the second network may give the access terminal higher priority access to the network than is given to other access terminals (e.g., some or all of the other access terminals) that are randomly accessing the network. In some aspects, this may involve allocating resources (e.g., radio resources such as bandwidth) to the access terminal based the priority.

FIG. 8 illustrates an example of call flow that may be employed in a system (e.g., an LTE system) where access parameters are u in conjunction with redirection of an access terminal to another network (e.g., for a CSFB procedure).

In various situations, it may be desirable for a cellular system to deliver a page to a previously idle UE (i.e., access terminal) in its coverage, thus causing the UE to perform a random access procedure, while granting the resulting access procedure a higher priority than other access attempts. For example, such situations might occur in a widespread emergency situation such as a natural disaster, when the load on the system generally is extremely high and there are compelling reasons to prioritize service to certain users such as emergency responders.

When the paging procedure and the random access take place within the same system, there are already suitable methods for achieving this prioritization, e.g., via access class barring, selective throttling of lower-priority paging messages at the network, etc. However, if the paging and access procedures take place on different networks, the paging network may not be aware of the loading conditions on the other network, and may have no mechanism to indicate directly to the other network that the resulting access attempt should be given high priority. Such a situation may arise, for example, when an LTE system triggers a "CS fallback" (CSFB) behavior, causing a UE in service in the LTE network to move to a network of another radio access technology, such as UMTS or GSM, to originate a high-priority communication there.

In accordance with aspects of the disclosure, a class of signaling solutions may be employed to allow access attempts of the type described to be given high priority. For example, consider a UE that is in service on a "source" system, in which the UE is brought into a connected or active state on the source system, and is then directed by dedicated signalling to perform access on a different ("target") system. In some embodiments, the source system may be an LTE system, the target system may be a system of a different access technology such as UMTS or GSM, and the dedicated signalling may be a redirection message comprising parameters that have the effect of directing the UE to move to the target system and perform a random access procedure to enter into a connected or active state there.

To facilitate treatment by the target system of the access attempt as high priority, the redirection message sent from the source system may include certain additional parameters that affect the handling of the access attempt.

For example, the redirection message may include an indication of an access class or access service class to be used by the UE in the target system. Such classes exist in many cellular technologies, and may have the effect of assigning access attempts to particular radio resources (e.g., by mapping access service classes to particular RACH resources in UMTS) or of allowing UEs with certain access classes to bypass restrictions such as access class barring.

Conventionally, these classes are associated statically with a particular UE and/or assigned by the serving network (i.e., the same network in which they will be used corresponding to the target network here). However, in accordance with the teachings herein, the class(es) assigned by the source system may override the normal methodologies for determining the class(es) associated with the UE in the target system.

In some implementations, the redirection message may comprise a cause value to be delivered as part of the access attempt in the target system (e.g., a value to be used in the information element "Establishment cause" in a UMTS system). Such a value would have semantics ultimately defined by the target system, although it would be delivered over the air to the UE by the source system. Various values could be used, including the possibility of using multiple cause values for different types of prioritized access; e.g., a source network could indicate to some UEs that their access attempts on the target system should be identified as emergency calls, and to others that their access attempts on the target system should be identified as high-priority signaling requests. Various values could be used to partition different groups of prioritized users (e.g., one value for emergency responders and another value for operator employees, both of whom might be granted priority in many situations, but who should be distinguishable from one another by the target system).

In any of the cases described, the appropriate values and any related policies for setting the parameters conveyed by the redirection message may be provided by the target network to the source network, e.g., via an interworking interface. For example, the target network may provide to the source network one or more cause values to be used for various classes of prioritised CS fallback.

FIG. 9A illustrates several sample components that may be incorporated into nodes, such as an access terminal 902 and a network entity 904 (e.g., a mobility manager), to perform access control operations as described herein. The described components may be incorporated into various nodes in a communication system. For example, the components described for the network entity 904 may be employed to provide source-related operations and/or target-related operations. A given node may comprise one or more of the described components. For example, an access terminal may comprise multiple transmitter and receiver components that enable the access terminal to communicate via different technologies.

As shown in FIG. 9A, the access terminal 902 and the network entity 904 include transmitters and receivers for communicating with other nodes. The access terminal 902 includes a wireless transmitter 906 for sending signals (e.g., messages and parameters) and a receiver 908 for receiving signals. Similarly, the network entity 904 includes a transmitter 910 for sending signals and a receiver 912 for receiving signals (e.g., via wire-based links or wireless links).

The access terminal 902 and the network entity 904 also include other components that may be used in conjunction with access priority-related operations as described herein. For example, the access terminal 902 and the network entity 904 may include communication controllers 914, 916, respectively, for managing communication with other nodes (e.g., formatting, processing, sending, and receiving messages and parameters) and for providing other related functionality as described herein. In addition, the access terminal 902 and the network entity 904 may include access controllers 918, 920, respectively, for performing access priority-related operations (e.g., sending and receiving access parameters, using access parameters to allocate resources for access terminal access, controlling access, and so on) and for providing other related functionality as described herein, depending on the operations being performed by the network entity (e.g., source-related operations or target-related operations).

In some implementations the components of FIG. 9A may be implemented in a processing system comprising, for example, one or more processors (e.g., that utilize and/or incorporate data memory for storing information or code used by the processor(s) to provide this functionality). For example, the functionality of blocks 914, 918 (and potentially one or more of the functional of blocks 906, 908) may be implemented by a processor or processors of an access terminal and data memory of the access terminal (e.g., by execution of appropriate code and/or by appropriate configuration of processor components). Similarly, the functionality of blocks 916, 920 (and potentially some of the functional of blocks 910, 912) may be implemented by a processor or processors of a network entity and data memory of the network entity (e.g., by execution of appropriate code and/or by appropriate configuration of processor components).

FIG. 9B shows a diagram illustrating an embodiment of a hardware implementation for an apparatus 950 employing a processing system 956 and a memory 958, in accordance with aspects of the disclosure. In various implementations, the apparatus 950 comprises an example of one or more of the wireless communication devices of FIG. 1. As shown in FIG. 9B, the wireless communication device 950 comprises a receiver 952 that receives a signal from, for instance, a receive antenna (not shown), performs actions on (e.g., filters, amplifies, downconverts, etc.) the received signal, and digitizes the conditioned signal to obtain samples. The receiver 952 may comprise a demodulator 954 that may demodulate received symbols and provide them to the processing system 956 for channel estimation. The processing system 956 may comprise one or more processors configured for analyzing information received by the receiver 952 and/or for generating information for transmission by a transmitter 970. The transmitter 970 may utilize a modulator 968 that may modulate symbols for transmission provided by the processing system 956. In an implementation, the processing system 956 may comprise one or more processors configured to control one or more components of the wireless communication device 950. In another implementation, the processing system 956 may comprise one or more processors configured to analyze information received by the receiver 952, generate information for transmission by the transmitter 970, and/or control one or more components of the wireless communication device 950.

The wireless communication device 950 comprises the memory 958 that is operatively coupled to the processor 956. The memory 958 may be configured to store data to be transmitted, received data, information related to available channels, data associated with analyzed signal and/or interference strength, information related to an assigned channel, power, rate, or the like, and any other suitable information for estimating a channel and communicating via the channel. The memory 958 may be configured to store protocols and/or algorithms associated with estimating and/or utilizing a channel (e.g., performance based, capacity based, etc.).

Further, the processor 956 may provide means for providing a message from a first network to a device, wherein the message comprises one or more parameters for access to a second network. The processor 956 may provide means for directing the device to switch from the first network to the second network based on the one or more parameters provided by the first network and means for directing the device to perform random access on the second network based on the one or more parameters provided by the first network.

It should be appreciated that data store (e.g., memory 958) described herein may be either volatile memory or nonvolatile memory, or may include both volatile and nonvolatile memory. By way of illustration, and not limitation, nonvolatile memory may include read only memory (ROM), programmable ROM (PROM), electrically programmable ROM (EPROM), electrically erasable PROM (EEPROM), or flash memory. Volatile memory may include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 958 of the subject systems and methods may comprise, without being limited to, these and any other suitable types of memory.

In an implementation, the wireless communication device 950 may include one or more modules 980*a*, 980*b*, 980*c* configured for performing aspects of the disclosure. For example, the wireless communication device 950 may include a module 980*a* configured for providing a message from a first network to a device, wherein the message comprises one or more parameters for access to a second network. The wireless communication device 950 may include a module 980*b*) configured for directing the device to switch from the first network to the second network based on the one or more parameters provided by the first network. The wireless communication device 950 may include a module 980*c* configured for directing the device to perform random access on the second network based on the one or more parameters provided by the first network. The wireless communication device 950 may include modules configured to perform each of the steps in the aforementioned flow charts. As such, each step in the aforementioned flow charts may be performed by a module, and the wireless communication device 950 may include one or more of those modules.

In an implementation, the wireless communication device 950 may include a user interface 990. The user interface 990 may include input mechanisms 992 for generating inputs into the wireless communication device 950, and an output mechanism 994 for generating information for consumption by the user of the wireless communication device 950. For example, the input mechanism 992 may include a mechanism, such as a key or keyboard, a mouse, a touch-screen display, a microphone, etc. In an example, the output mechanism 994 may include a display, an audio speaker, a haptic feedback mechanism, a Personal Area Network (PAN) transceiver etc. In the illustrated embodiments, the output mechanism 994 may include a display operable to present media content that is in image or video format or an audio speaker to present media content that is in an audio format.

Figure 10:
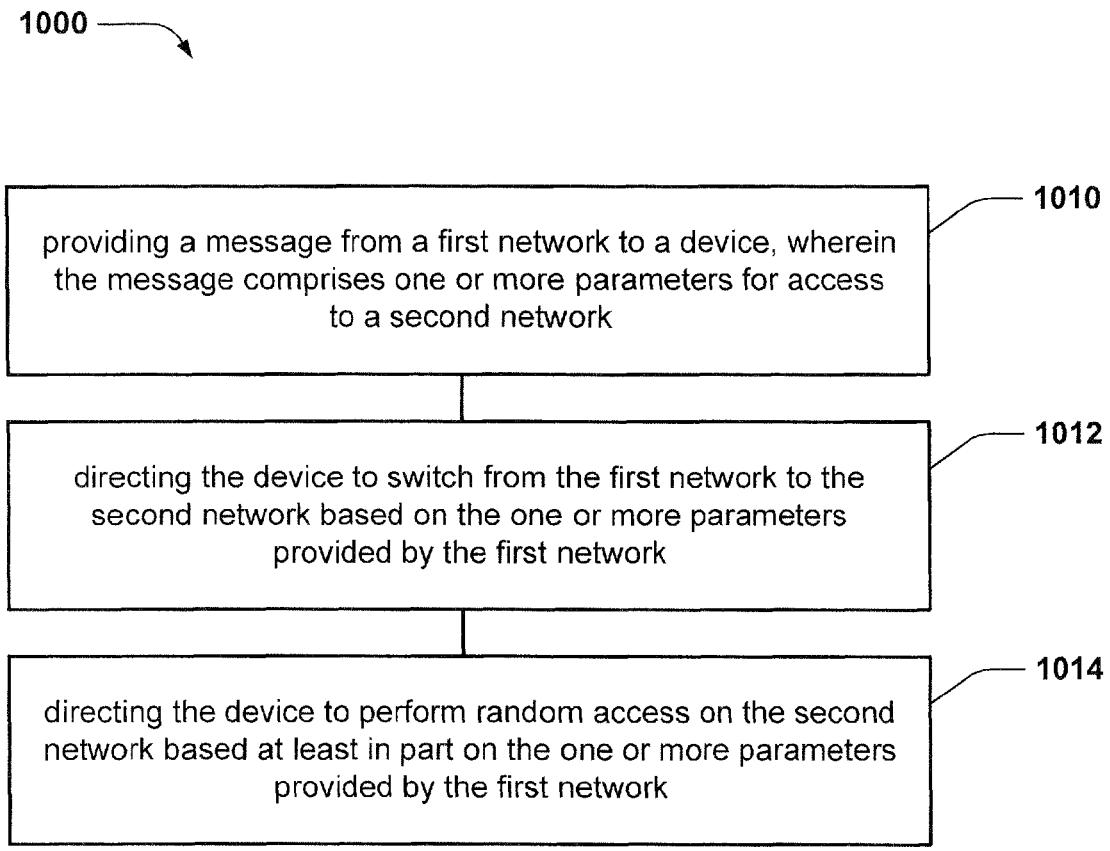
FIG. 10 shows a diagram illustrating an embodiment of a process flow for a method of utilizing network access parameters in wireless communication systems, in accordance with aspects of the disclosure.

FIG. 10 is a diagram 1000 illustrating an embodiment of a process flow for a method of utilizing network access parameters in wireless communication systems, in accordance with aspects of the disclosure.

Referring to FIG. 10, at 1010, the method is configured for providing a message from a first network to a device, wherein the message comprises one or more parameters for access to a second network. At 1012, the method is configured for directing the device to switch from the first network to the second network based on the one or more parameters provided by the first network. At 1014, the method is configured for directing the device to perform random access on the second network based at least in part on the one or more parameters provided by the first network. In an implementation, the one or more parameters may comprise a priority parameter for performing random access on the second network.

In an implementation, the message may comprise a redirection message having the one or more parameters that direct the device to switch from the first network to the second network. The priority parameter may provide an indication that the performing random access on the second network comprises a higher priority to performing other random accesses on the second network. The priority parameter may provide an indication that the performing random access on the second network comprises at least one of ignoring access class barring and adopting a different access class. The priority parameter may provide an indication that the performing random access on the second network comprises delivering a parameter that the second network may use in prioritization of attempting random access. The one or more parameters provided by the first network may comprise at least one of an access class parameter and an access service class parameter. The one or more parameters provided by the first network may comprise an establishment cause parameter. The one or more parameters provided by the first network may include one or more values that are provided to the first network by the second network. The message may further comprise one or more associations between the parameters and the device. The one or more associations between the parameters and the device may provide an indication of whether the device is temporarily adopting the use of a different access class. The one or more parameters provided by the first network may affect radio resources used by the device for random access on the second network. The first network may comprise a Long Term Evolution (LTE) based network. The second network may comprise a Universal Mobile Telecommunications System (UMTS) based network or a Global System for Mobile Communications (GSM) based network.

Figure 11:
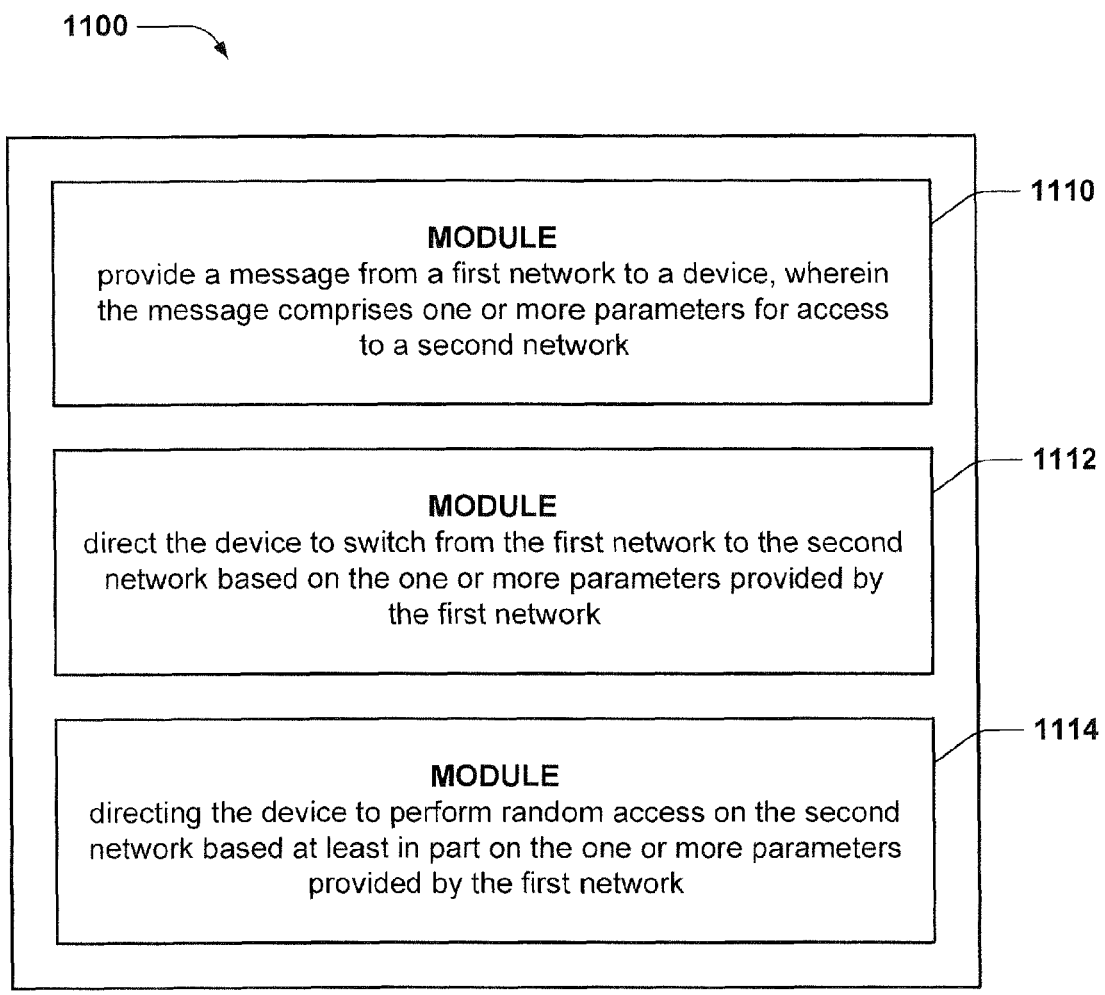
FIG. 11 shows a diagram illustrating an embodiment of functionality of an apparatus configured to utilize network access parameters in wireless communication systems, in accordance with aspects of the disclosure.

FIG. 11 is a diagram 1100 illustrating an embodiment of functionality of an apparatus (e.g., the apparatus 950 of FIG. 9B) configured to utilize network access parameters in wireless communication systems, in accordance with aspects of the disclosure.

Referring to FIG. 11, the apparatus includes a module 1110 configured to provide a message from a first network to a device, wherein the message comprises one or more parameters for access to a second network. The apparatus includes a module 1112 configured to direct the device to switch from the first network to the second network based on the one or more parameters provided by the first network. The apparatus includes a module 1114 configured to directing the device to perform random access on the second network based at least in part on the one or more parameters provided by the first network. In an implementation, the one or more parameters may comprise a priority parameter for performing random access on the second network. The apparatus may include additional modules that perform each of the steps in the aforementioned flow charts. As such, each step in the aforementioned flow charts may be performed by a module and the apparatus may include one or more of those modules.

In an implementation, the message may comprise a redirection message having the one or more parameters that direct the device to switch from the first network to the second network. The priority parameter may provide an indication that the performing random access on the second network comprises a higher priority to performing other random accesses on the second network. The priority parameter may provide an indication that the performing random access on the second network comprises at least one of ignoring access class barring and adopting a different access class. The priority parameter may provide an indication that the performing random access on the second network comprises delivering a parameter that the second network may use in prioritization of attempting random access. The one or more parameters provided by the first network may comprise at least one of an access class parameter and an access service class parameter. The one or more parameters provided by the first network may comprise an establishment cause parameter. The one or more parameters provided by the first network may include one or more values that are provided to the first network by the second network. The message may further comprise one or more associations between the parameters and the device. The one or more associations between the parameters and the device may provide an indication of whether the device is temporarily adopting the use of a different access class. The one or more parameters provided by the first network may affect radio resources used by the device for random access on the second network. The first network may comprise a Long Term Evolution (LTE) based network. The second network may comprise a Universal Mobile Telecommunications System (UMTS) based network or a Global System for Mobile Communications (GSM) based network.

Referring to FIG. 9B, in a configuration, the apparatus 950 configured for wireless communication comprises the processing system 956 configured to provide a means for providing a message from a first network to a device, wherein the message comprises one or more parameters for access to a second network. The processing system 956 is configured to provide a means for directing the device to switch from the first network to the second network based on the one or more parameters provided by the first network. The processing system 956 is configured to provide a means for directing the device to perform random access on the second network based at least in part on the one or more parameters provided by the first network. In an implementation, the one or more parameters may comprise a priority parameter for performing random access on the second network In an implementation, the message may comprise a redirection message having the one or more parameters that direct the device to switch from the first network to the second network. The priority parameter may provide an indication that the performing random access on the second network comprises a higher priority to performing other random accesses on the second network. The priority parameter may provide an indication that the performing random access on the second network comprises at least one of ignoring access class barring and adopting a different access class. The priority parameter may provide an indication that the performing random access on the second network comprises delivering a parameter that the second network may use in prioritization of attempting random access. The one or more parameters provided by the first network may comprise at least one of an access class parameter and an access service class parameter. The one or more parameters provided by the first network may comprise an establishment cause parameter. The one or more parameters provided by the first network may include one or more values that are provided to the first network by the second network. The message may further comprise one or more associations between the parameters and the device. The one or more associations between the parameters and the device may provide an indication of whether the device is temporarily adopting the use of a different access class. The one or more parameters provided by the first network may affect radio resources used by the device for random access on the second network. The first network may comprise a Long Term Evolution (LTE) based network. The second network may comprise a Universal Mobile Telecommunications System (UMTS) based network or a Global System for Mobile Communications (GSM) based network.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. This functionality may be implemented in various ways consistent with the teachings herein. In some aspects this functionality may be implemented as one or more electrical components. In some aspects this functionality may be implemented as a processing system including one or more processor components. In some aspects this functionality may be implemented using, for example, at least a portion of one or more integrated circuits (e.g., an ASIC). As discussed herein, an integrated circuit may include a processor, software, other related components, or some combination thereof. This functionality also may be implemented in some other manner as described herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Unless stated otherwise a set of elements may comprise one or more elements. Terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. It should be appreciated that skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method for wireless communication, comprising:
providing a message from a first network to a device, wherein the message comprises one or more parameters for access to a second network;
directing the device to switch from the first network to the second network based on the one or more parameters provided by the first network; and
directing the device to access the second network based at least in part on the one or more parameters provided by the first network,
wherein the one or more parameters comprise a priority parameter for the second network and are associated with one or more different priorities at the second network.

2. The method of claim 1, wherein the message comprises a redirection message having the one or more parameters that direct the device to switch from the first network to the second network.

3. The method of claim 1, wherein the priority parameter provides an indication that the access of the second network is a higher priority than other accesses to the second network.

4. The method of claim 1, wherein the priority parameter provides an indication that the access of the second network comprises at least one of ignoring access class barring and adopting a different access class.

5. The method of claim 1, wherein the priority parameter provides an indication that the access of the second network comprises delivering a parameter that the second network may use in prioritization of attempting access.

6. The method of claim 1, wherein the one or more parameters provided by the first network comprise at least one of an access class parameter and an access service class parameter.

7. The method of claim 1, wherein the one or more parameters provided by the first network comprise an establishment cause parameter.

8. The method of claim 1, wherein the one or more parameters provided by the first network include one or more values that are provided to the first network by the second network.

9. The method of claim 1, wherein the one or more parameters provided by the first network affect radio resources used by the device for accessing the second network.

10. The method of claim 1, wherein the first network comprises a Long Term Evolution (LTE) based network.

11. The method of claim 1, wherein the second network comprises a Universal Mobile Telecommunications System (UMTS) based network or a Global System for Mobile Communications (GSM) based network.

12. A method for wireless communication, comprising:
providing a message from a first network to a device, wherein the message comprises one or more parameters for access to a second network, wherein the message comprises one or more associations between the parameters and the device;

directing the device to switch from the first network to the second network based on the one or more parameters provided by the first network; and directing the device to access the second network based at least in part on the one or more parameters provided by the first network, wherein the one or more parameters comprise a priority parameter for the second network and are associated with one or more different priorities at the second network, wherein the one or more associations between the parameters and the device provide an indication of whether the device is temporarily adopting the use of a different access class.

13. An apparatus for wireless communications, comprising:

a processing system; and a storage medium coupled to the processing system storing codes that when executed by the processing system cause the apparatus to:

provide a message from a first network to a device, wherein the message comprises one or more parameters for access to a second network;

direct the device to switch from the first network to the second network based on the one or more parameters provided by the first network; and direct the device to access the second network based at least in part on the one or more parameters provided by the first network, wherein the one or more parameters comprise a priority parameter for the second network and are associated with one or more different priorities at the second network.

14. The apparatus of claim 13, wherein the message comprises a redirection message having the one or more parameters that direct the device to switch from the first network to the second network.

15. The apparatus of claim 13, wherein the priority parameter provides an indication that the access of the second network is a higher priority than other accesses to the second network.

16. The apparatus of claim 13, wherein the priority parameter provides an indication that the access of the second network comprises at least one of ignoring access class barring and adopting a different access class.

17. The apparatus of claim 13, wherein the priority parameter provides an indication that the access of the second network comprises delivering a parameter that the second network may use in prioritization of attempting access.

18. The apparatus of claim 13, wherein the one or more parameters provided by the first network comprise at least one of an access class parameter and an access service class parameter.

19. The apparatus of claim 13, wherein the one or more parameters provided by the first network comprise an establishment cause parameter.

20. The apparatus of claim 13, wherein the one or more parameters provided by the first network include one or more values that are provided to the first network by the second network.

21. The apparatus of claim 13, wherein the one or more parameters provided by the first network affect radio resources used by the device for accessing the second network.

22. The apparatus of claim 13, wherein the first network comprises a Long Term Evolution (LTE) based network.

23. The apparatus of claim 13, wherein the second network comprises a Universal Mobile Telecommunications System (UMTS) based network or a Global System for Mobile Communications (GSM) based network.

24. An apparatus for wireless communications, comprising:

a processing system; and a storage medium coupled to the processing system storing codes that when executed by the processing system cause the apparatus to:

provide a message from a first network to a device, wherein the message comprises one or more parameters for access to a second network, wherein the message comprises one or more associations between the parameters and the device;

direct the device to switch from the first network to the second network based on the one or more parameters provided by the first network; and direct the device to access the second network based at least in part on the one or more parameters provided by the first network, wherein the one or more parameters comprise a priority parameter for the second network and are associated with one or more different priorities at the second network, wherein the one or more associations between the parameters and the device provide an indication of whether the device is temporarily adopting the use of a different access class.

25. An apparatus for wireless communication, comprising:

means for providing a message from a first network to a device, wherein the message comprises one or more parameters for access to a second network;

means for directing the device to switch from the first network to the second network based on the one or more parameters provided by the first network; and means for directing the device to access the second network based at least in part on the one or more parameters provided by the first network, wherein the one or more parameters comprise a priority parameter for the second network and are associated with one or more different priorities at the second network.

26. The apparatus of claim 25, wherein the message comprises a redirection message having the one or more parameters that direct the device to switch from the first network to the second network.

27. The apparatus of claim 25, wherein the priority parameter provides an indication that the access of the second network is a higher priority than other accesses to the second network.

28. The apparatus of claim 25, wherein the priority parameter provides an indication that the access of the second network comprises at least one of ignoring access class barring and adopting a different access class.

29. The apparatus of claim 25, wherein the priority parameter provides an indication that the access of the second network comprises delivering a parameter that the second network may use in prioritization of attempting access.

30. The apparatus of claim 25, wherein the one or more parameters provided by the first network comprise at least one of an access class parameter and an access service class parameter.

31. The apparatus of claim 25, wherein the one or more parameters provided by the first network comprise an establishment cause parameter.

32. The apparatus of claim 25, wherein the one or more parameters provided by the first network include one or more values that are provided to the first network by the second network.

33. The apparatus of claim 25, wherein the one or more parameters provided by the first network affect radio resources used by the device for accessing the second network.

34. The apparatus of claim 25, wherein the first network comprises a Long Term Evolution (LTE) based network.

35. The apparatus of claim 25, wherein the second network comprises a Universal Mobile Telecommunications System (UMTS) based network or a Global System for Mobile Communications (GSM) based network.

36. An apparatus for wireless communication, comprising:
means for providing a message from a first network to a device, wherein the message comprises one or more parameters for access to a second network, wherein the message comprises one or more associations between the parameters and the device;
means for directing the device to switch from the first network to the second network based on the one or more parameters provided by the first network; and
means for directing the device to access the second network based at least in part on the one or more parameters provided by the first network,
wherein the one or more parameters comprise a priority parameter for the second network and are associated with one or more different priorities at the second network, wherein the one or more associations between the parameters and the device provide an indication of whether the device is temporarily adopting the use of a different access class.

37. A computer program product, comprising:
a non-transitory computer-readable medium comprising code executable to cause an apparatus to:
provide a message from a first network to a device, wherein the message comprises one or more parameters for access to a second network;
direct the device to switch from the first network to the second network based on the one or more parameters provided by the first network; and
direct the device to access the second network based at least in part on the one or more parameters provided by the first network,
wherein the one or more parameters comprise a priority parameter for the second network and are associated with one or more different priorities at the second network.

38. The computer program product of claim 37, wherein the message comprises a redirection message having the one or more parameters that direct the device to switch from the first network to the second network.

39. The computer program product of claim 37, wherein the priority parameter provides an indication that the access of the second network is a higher priority than other accesses to the second network.

40. The computer program product of claim 37, wherein the priority parameter provides an indication that the access of the second network comprises at least one of ignoring access class barring and adopting a different access class.

41. The computer program product of claim 37, wherein the priority parameter provides an indication that the access of the second network comprises delivering a parameter that the second network may use in prioritization of attempting access.

42. The computer program product of claim 37, wherein the one or more parameters provided by the first network comprise at least one of an access class parameter and an access service class parameter.

43. The computer program product of claim 37, wherein the one or more parameters provided by the first network comprise an establishment cause parameter.

44. The computer program product of claim 37, wherein the one or more parameters provided by the first network include one or more values that are provided to the first network by the second network.

45. The computer program product of claim 37, wherein the one or more parameters provided by the first network affect radio resources used by the device for access on the second network.

46. The computer program product of claim 37, wherein the first network comprises a Long Term Evolution (LTE) based network.

47. The computer program product of claim 37, wherein the second network comprises a Universal Mobile Telecommunications System (UMTS) based network or a Global System for Mobile Communications (GSM) based network.

48. A computer program product, comprising:
a non-transitory computer-readable medium comprising code executable to cause an apparatus to:
provide a message from a first network to a device, wherein the message comprises one or more parameters for access to a second network, wherein the message comprises one or more associations between the parameters and the device;
direct the device to switch from the first network to the second network based on the one or more parameters provided by the first network; and
direct the device to accessing the second network based at least in part on the one or more parameters provided by the first network,
wherein the one or more parameters comprise a priority parameter for the second network and are associated with one or more different priorities at the second network, wherein the one or more associations between the parameters and the device provide an indication of whether the device is temporarily adopting the use of a different access class.

* * * * *